(12) United States Patent
Sekiguchi

(10) Patent No.: US 6,961,661 B2
(45) Date of Patent: Nov. 1, 2005

(54) VEHICLE SURROUNDINGS MONITORING APPARATUS AND TRAVELING CONTROL SYSTEM INCORPORATING THE APPARATUS

(75) Inventor: Hiroyuki Sekiguchi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 83 days.

(21) Appl. No.: 10/665,136

(22) Filed: Sep. 16, 2003

(65) Prior Publication Data

US 2004/0064241 A1 Apr. 1, 2004

(30) Foreign Application Priority Data

Sep. 18, 2002 (JP) ........................................ 2002-271905

(51) Int. Cl.[7] ............................................. B60R 21/00
(52) U.S. Cl. ......................................... 701/301; 701/96
(58) Field of Search ...................... 701/96, 301; 342/70, 342/71; 348/118, 119, 148

(56) References Cited

U.S. PATENT DOCUMENTS

| | | | | | |
|---|---|---|---|---|---|
| 5,301,115 | A | * | 4/1994 | Nouso | 701/300 |
| 5,367,457 | A | * | 11/1994 | Ishida | 701/28 |
| 5,467,283 | A | * | 11/1995 | Butsuen et al. | 701/301 |
| 5,745,870 | A | * | 4/1998 | Yamamoto et al. | 701/301 |
| 6,202,027 | B1 | * | 3/2001 | Alland et al. | 701/301 |
| 6,311,119 | B2 | * | 10/2001 | Sawamoto et al. | 701/96 |
| 6,411,901 | B1 | * | 6/2002 | Hiwatashi et al. | 701/301 |
| 6,430,494 | B1 | * | 8/2002 | Inoue et al. | 701/96 |
| 6,556,913 | B2 | * | 4/2003 | Morizane et al. | 701/93 |
| 6,567,748 | B2 | * | 5/2003 | Matsuno | 701/301 |
| 6,765,480 | B2 | * | 7/2004 | Tseng | 340/425.5 |
| 6,826,479 | B2 | * | 11/2004 | Miyahara | 701/301 |
| 2001/0053955 | A1 | * | 12/2001 | Shirai et al. | 701/200 |

FOREIGN PATENT DOCUMENTS

JP 09-091598 4/1997

OTHER PUBLICATIONS

Patent Abstracts of Japan for JP09–091598 published on Apr. 4, 1997.

* cited by examiner

*Primary Examiner*—Michael J. Zanelli
(74) *Attorney, Agent, or Firm*—Darby & Darby

(57) ABSTRACT

A vehicle surroundings monitoring apparatus inputs images taken by a stereoscopic camera, vehicle speeds, steering wheel rotation angles, yaw rates and ON-OFF signals of a turn signal switch. An own travailing path C is calculated from an own traveling path A obtained from lane markers and side walls and an own traveling path B obtained from yaw rates of the own vehicle. Further, a new own traveling path E is calculated from the own traveling path C and a trace of a preceding vehicle, in which case where there is no possibility of a lane change of the preceding vehicle and the turn signal switch is turned off and the absolute value of the steering wheel rotation angle is smaller than a specified value and a present own traveling path is calculated from the own travailing path E and a previous own traveling path. In other cases, the present own traveling path is calculating from the travailing path C and the previous own traveling path.

16 Claims, 6 Drawing Sheets

VEHICLE SURROUNDINGS MONITORING APPARATUS AND TRAVELING CONTROL SYSTEM INCORPORATING THE APPARATUS

BACKGROUND OF THE INVENTION

1. Field of the Invention

The present invention relates to a vehicle surroundings monitoring apparatus for recognizing traveling circumstances in front of an own vehicle by stereoscopic cameras, monocular cameras, millimeter wave radars, and the like and for accurately estimating traveling paths of an own vehicle and a traveling control system incorporating such a vehicle surroundings monitoring apparatus.

2. Discussion of Related Arts

In recent years, such a traveling control system as detecting traveling circumstances in front of an own vehicle by a camera and the like mounted on a vehicle, estimating traveling paths of the own vehicle from the traveling circumstances data, detecting a preceding vehicle traveling ahead of the own vehicle and making a follow-up control of the preceding vehicle or an intervehicle distance control between the own vehicle and the preceding vehicle, has been put into practical use.

For example, Japanese Patent Application Laid-open No. Toku-Kai-Hei 9-91598 discloses a traveling control system in which a traveling path of an own vehicle is estimated from traveling conditions such as yaw rate and other data and a nearest obstacle on the traveling path is detected as a preceding vehicle to be monitored. Further, in the traveling control system, when the preceding vehicle goes out of the traveling path of the own vehicle, the monitoring of the preceding vehicle is released.

However, the prior technology in which a traveling path of an own vehicle (hereinafter referred to just as own traveling path) is estimated and a preceding vehicle is caught based on the own traveling path, has a defect that if the estimation of the own traveling path is inaccurate, the capture of the preceding vehicle itself loses reliability and as a result a desired traveling control can not be realized.

SUMMARY OF THE INVENTION

It is an object of the present invention to provide a vehicle surroundings monitoring apparatus capable of stably estimating an own traveling path with high precision and to provide a traveling control system incorporating such a vehicle surroundings monitoring apparatus.

According to the present invention, a vehicle surroundings monitoring apparatus inputs images taken by a stereoscopic camera, vehicle speeds, steering wheel rotation angles, yaw rates and ON-OFF signals of a turn signal switch. An own traveling path C is calculated from an own traveling path A obtained from lane markers and side walls and an own traveling path B obtained from yaw rates of the own vehicle. Further, a new own traveling path E is calculated from the own traveling path C and a trace of a preceding vehicle in case where there is no possibility of a lane change of the preceding vehicle and the turn signal switch is turned off and the absolute value of the steering wheel rotation angle is smaller than a specified value and a present own traveling path is calculated from the own traveling path E and the previous own traveling path. In other cases, the present own traveling path is calculated from the own traveling path C and the previous own traveling path.

DESRIPTION OF THE PREFERRED EMBODIMENT

Figure 1:
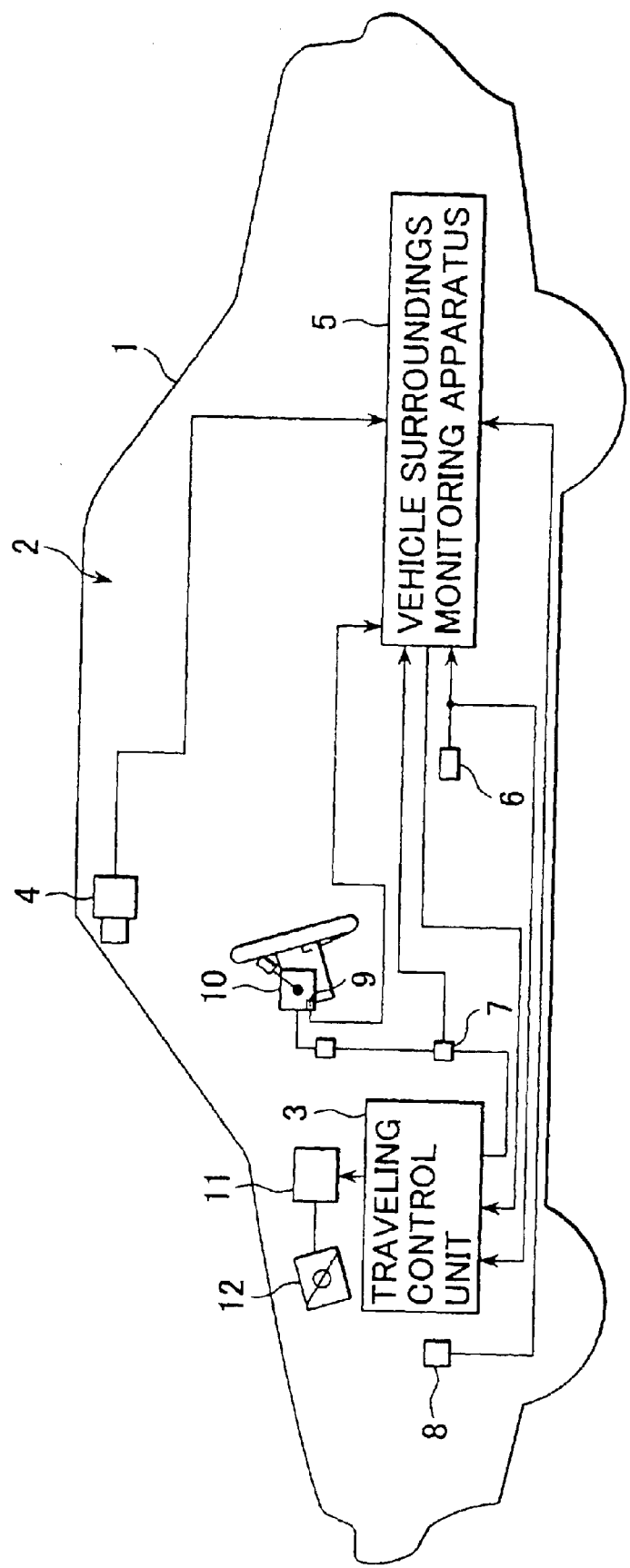
FIG. 1 is a schematic diagram showing a traveling control system incorporating a vehicle surroundings monitoring apparatus according to the present invention.

Referring now to FIG. 1, reference numeral 1 denotes a vehicle (own vehicle) on which an intervehicle distance automatically adjusting system (Adaptive Cruise Control: ACC) 2 is mounted. The ACC system 2 is constituted by a traveling control unit 3, a stereoscopic camera 4 and a vehicle surroundings monitoring apparatus 5. When the ACC system is set to a constant speed control mode, the vehicle travels at a speed established by a vehicle driver and when the system is set to a follow-up traveling control mode, the vehicle travels at a speed targeted to the speed of a preceding vehicle with a constant intervehicle distance to the preceding vehicle maintained.

The stereoscopic camera 4 constituting vehicle forward information detecting means is composed of a pair (left and right) of CCD cameras using a solid-state image component such as Charge Coupled Device and the left and right cameras are transversely mounted on a front ceiling of a passenger compartment at a specified interval of distance, respectively. The respective cameras take picture images of an outside object from different view points and input the picture images to the vehicle surroundings monitoring apparatus 5.

Further, the vehicle 1 has a vehicle speed sensor 6 for detecting a vehicle speed and the detected vehicle speed is inputted to the traveling control unit 3 and the vehicle surroundings monitoring apparatus 5, respectively. Further, the vehicle 1 has a steering angle sensor 7 for detecting a steering angle and a yaw rate sensor B for detecting a yaw rate and the detected steering angle and yaw rate signals are inputted to the vehicle surroundings monitoring apparatus 5. Further, a signal from a turn signal switch 9 is inputted to the vehicle surroundings monitoring apparatus 5. These sensors 6, 7, 8 and the switch 9 act as own vehicle traveling conditions detecting means.

The vehicle surroundings monitoring apparatus 5 inputs respective signals indicative of picture images from the stereoscopic camera 4, vehicle speeds, steering angle, yaw rate and turn signal and detects frontal information about solid objects, side walls and lane markers in front of the vehicle 1 based on the picture images inputted from the stereoscopic camera 4. Then, the apparatus estimates several traveling paths of the own vehicle 1 from the frontal information and traveling conditions of the own vehicle 1 according to the flowchart which will be described hereinafter and estimates a final traveling path of the own vehicle 1 from those traveling paths. Further, the apparatus establishes a traveling region A corresponding to a detected solid object based on the final traveling path. Further, the apparatus establishes a traveling region B corresponding to the solid object based on at least either of the traveling region A and the traveling road information and judges whether the solid object is a preceding vehicle, a tentative preceding vehicle or others according to the state of existence of the solid object in the traveling regions A and B. As a result of the judgment, a preceding vehicle in front of the own vehicle 1 is extracted and the result is outputted to the traveling control unit 3. The vehicle surroundings monitoring apparatus 5 includes frontal information detecting means, first own traveling path calculating means, second own traveling path calculating means, third own traveling path calculating means and final own traveling path calculating means.

Describing the process of estimating the own traveling path in brief, a new own traveling path C is calculated from the own traveling path A (first own traveling path) obtained based on lane markers and side walls and the own traveling path B (second own traveling path) obtained based on yaw rates of the own vehicle. Then, the possibility of a lane change of the preceding vehicle is judged from the relationship between the own traveling path C, the preceding vehicle and the solid object in the vicinity of the preceding vehicle. In case where there is no possibility of a lane change of the preceding vehicle, the turn signal switch is turned off, and the absolute value of the steering wheel rotation angle is smaller than a specified value, a new own traveling path E is calculated from the own traveling path C and the locus of the preceding vehicle and a present own traveling path is calculated from the own traveling path E and the previous own traveling path. On the other hand, in case where the conditions described above are not satisfied, a present own traveling path is calculated from the own traveling path C and the previous own traveling path. The vehicle surroundings monitoring apparatus 5 comprises forward information detecting means, preceding vehicle recognizing means, own traveling path estimating means, first lane change possibility judging means and second lane change possibility judging means.

Describing the processing of images from the stereoscopic camera 4 in the vehicle surroundings monitoring apparatus 5, with respect to a pair of stereoscopic images taken by the stereoscopic CCD camera 4, distance information over the entire image is obtained from the deviation amount between corresponding positions according to the principle of triangulation and a distance image representing three-dimensional distance distribution is formed based on the distance information. Then, lane marker data, side wall data such as guard rails, curbs and side walls arranged along the road and solid object data such as vehicles and the like, are extracted by means of the known grouping process and the like by comparing the distance image with the three-dimensional road profile data, side wall data, solid object data and the like stored beforehand. Thus extracted lane marker data, side wall data and solid object data are denoted by different numbers respectively. Further, the solid object data are classified into three kinds of objects, a backward moving object moving toward the own vehicle 1, a still object in stand still and a forward moving object moving in the same direction as the own vehicle 1 based on the relationship between the relative displacement of the distance from the own vehicle and the vehicle speed of the own vehicle 1 and the respective solid object data are outputted.

The traveling control unit 3 is equipped with a function of a constant speed traveling control for maintaining the vehicle speed at a value inputted by the vehicle driver and a function of a follow-up traveling control for following up the preceding vehicle in a condition to keep the intervehicle distance between the own vehicle land the preceding vehicle constant. The traveling control unit 3 is connected with a constant speed traveling switch 10 constituted by a plurality of switches operated by a constant speed traveling selector lever provided on the side surface of a steering column, the vehicle surroundings monitoring apparatus 5, the vehicle speed sensor 6 and the like.

The constant speed traveling switch 10 is constituted by a speed setting switch for setting a target vehicle speed at the constant speed traveling mode, a coast switch for changing the target vehicle speed in a descending direction and a resume switch for changing the target vehicle speed in an ascending direction. Further, a main switch (not shown) for turning the traveling control on or off is disposed in the vicinity of the constant speed traveling selector lever.

When the driver turns a main switch (not shown) on and sets a desired vehicle speed by operating the constant speed traveling selector lever, a signal indicative of the desired vehicle speed inputs from the constant speed traveling switch 10 to the traveling control unit 3 and a throttle valve 12 driven by a throttle actuator 11 makes a feed-back control so as to converge the vehicle speed detected by the vehicle speed sensor 6 to the established vehicle speed. As a result, the own vehicle 1 can travel at a constant speed automatically.

Further, when the traveling control unit 3 makes a constant traveling control, supposing a case where the vehicle surroundings monitoring apparatus 5 recognizes a preceding vehicle, which is traveling at a lower speed than the established vehicle speed, the traveling control unit 3 automatically changes over to a follow-up traveling control mode in which the own vehicle travels in a condition retaining at a constant intervehicle distance.

When the constant speed traveling control mode is transferred to the follow-up traveling control mode, a target value of an appropriate intervehicle distance between the own vehicle 1 and the preceding vehicle is established based on the intervehicle distance obtained from the vehicle surroundings monitoring apparatus 5, the vehicle speed of the own vehicle 1 detected by the vehicle speed sensor 6 and the vehicle speed of the preceding vehicle obtained from the intervehicle distance and the vehicle speed of the own vehicle 1. Further, the traveling control unit 3 outputs a drive signal to the throttle actuator 11 and makes a feed-back control of the opening angle of the throttle valve 12 so that the intervehicle distance agrees with the target value and controls the own vehicle 1 in a condition following up the preceding vehicle with the intervehicle distance retained.

Next, a vehicle surroundings monitoring program of the vehicle surroundings monitoring apparatus 5 will be described by referring to a flowchart shown in FIG. 2.

In this embodiment, the coordinate system of the three-dimensional real space is transferred to a coordinate system fixed to the own vehicle. That is, the coordinate system is composed of X coordinate extending in a width wise direction of the own vehicle, Y coordinate extending in a vertical direction of the own vehicle, Z coordinate extending in a lengthwise direction of the own vehicle and an origin of the coordinate placed on the road surface directly underneath the central point of two CCD cameras. The positive sides of X, Y and z coordinates are established in a right direction, in an upward direction and in a forward direction, respectively.

Figure 2:
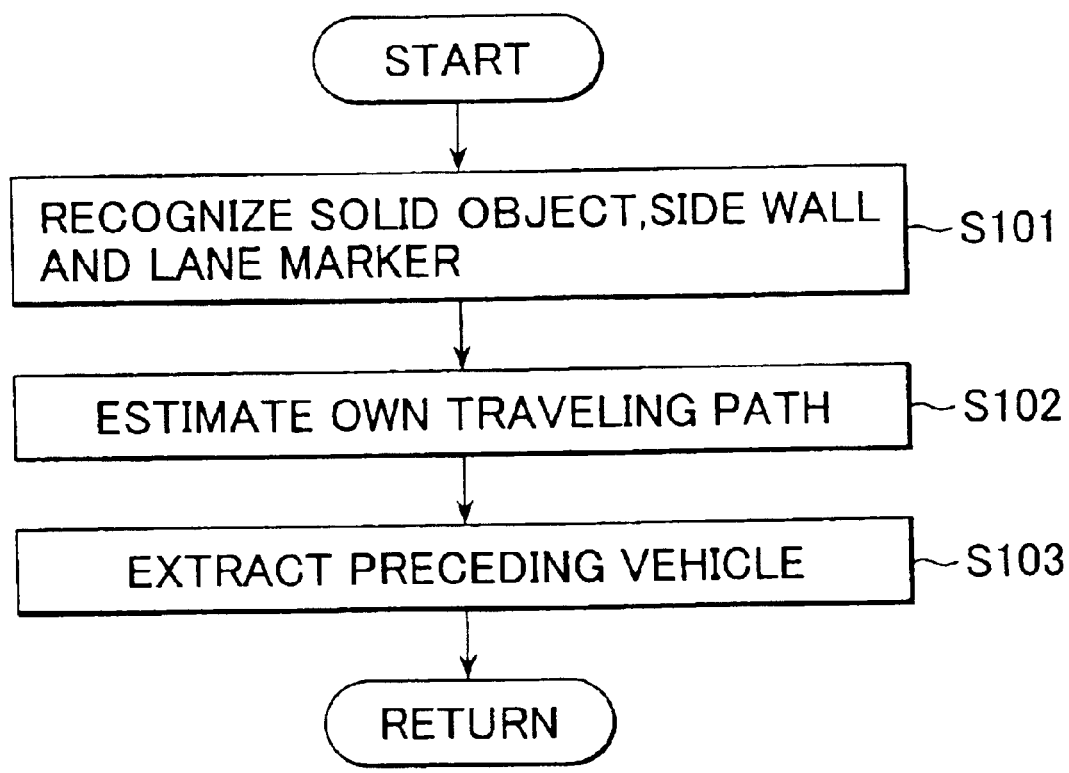
FIG. 2 is a flowchart showing a routine for monitoring surroundings of a vehicle.

The routine shown in FIG. 2 is energized every 50 milliseconds. First at a step (hereinafter abbreviated as S) 101, solid object data, side wall data including guard rails, curbs provided along the road and lane marker data are recognized based on images taken by the stereoscopic camera 4. Further, with respect to the solid object data, they are classified into three kinds of objects, backward moving objects, still objects and forward moving objects as described above.

Figure 3:
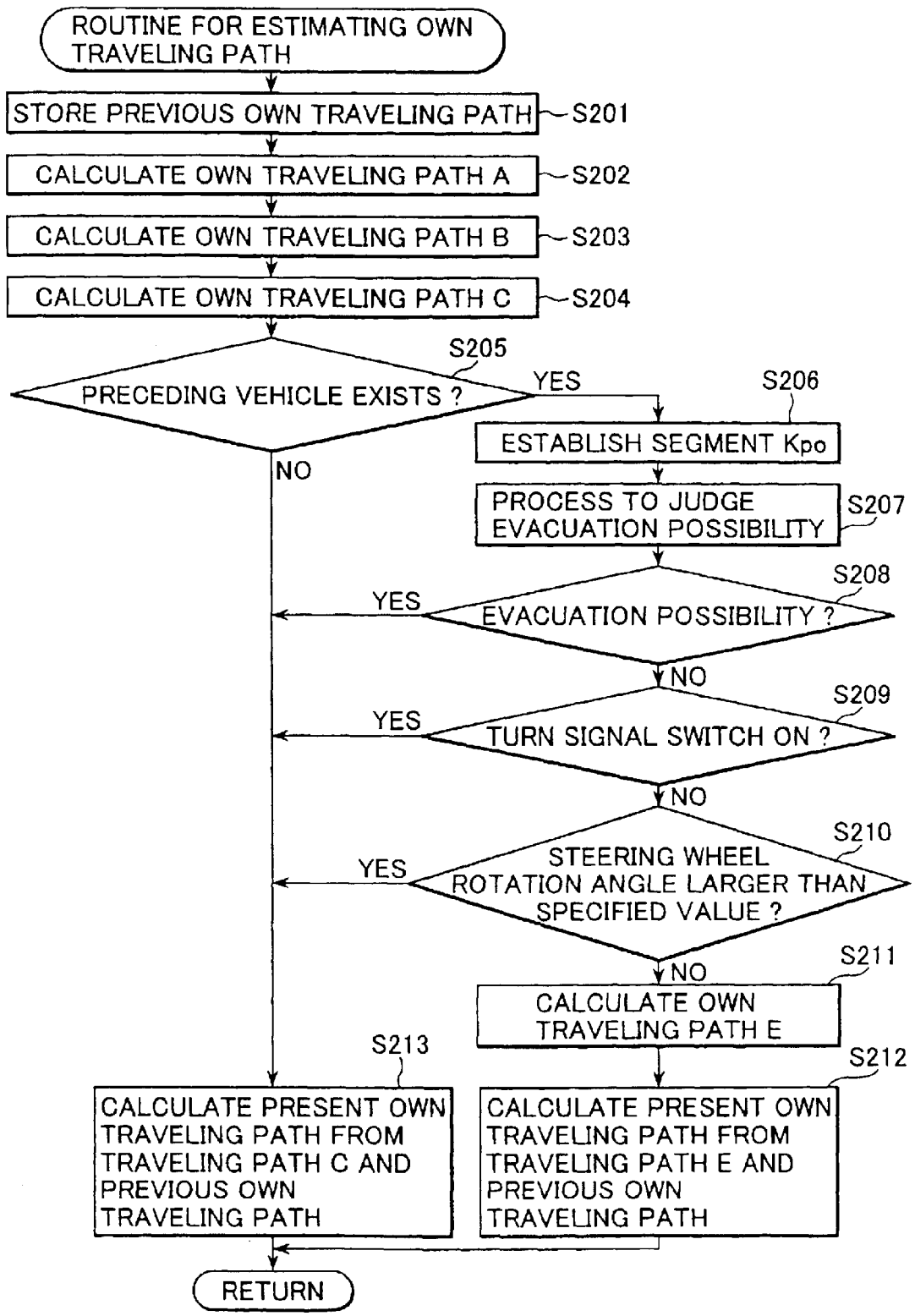
FIG. 3 is a flowchart showing a routine for estimating a traveling path of an own vehicle.

Next, the program goes to S102 where the traveling path of the own vehicle is estimated according to a flowchart which will be described hereinafter shown in FIG. 3. First, at S201, the presently obtained own traveling path $Xpr(n)[i]$ is stored as a previous own traveling path $Xpr(n-1)[i]$. [I] denotes node numbers (segment numbers) attached to the own traveling path extending forward from the own vehicle 1. In this embodiment, the own traveling path has 24 segments in a forward direction and is composed of a plurality of straight lines connected with each other. Accordingly, Z coordinate at the segment i is established as follows.

Z coordinate at segment $i$=10. 24 meters+$i$·4.096 meters ($I$=0 to 23)

Then, the program goes to S202 where an own traveling A ($Xpra[i]$, i=0 to 23) is calculated according to the following method A or B.

Method A: Estimation of Traveling Path Based on Lane Markers

In case where both or either of left and right lane markers data are obtained and the profile of the lane on which the own vehicle 1 travels can be estimated from these lane markers data, the traveling path of the own vehicle is formed in parallel with the lane markers in consideration of the width of the own vehicle 1 and the position of the own vehicle 1 in the present lane.

Method B: Estimation of Traveling Path Based on Side Wall Data

In case where both or either of left and right side walls data are obtained and the profile of the lane on which the own vehicle 1 travels can be estimated from these side walls data, the traveling path of the own vehicle is formed in parallel with the side walls in consideration of the width of the own vehicle 1 and the position of the own vehicle 1 in the present lane.

In case where the own traveling path A can not be established according to any of the methods A, B mentioned above, it is calculated according to the following methods C or D.

Method C: Estimation of Traveling Path Based on a Trace of the Preceding Vehicle The own traveling path is estimated based on the past traveling trace extracted from the solid object data of the preceding vehicle.

Method D: Estimation of Path Based on Trace of the Own Vehicle

The own traveling path is estimated based on the traveling conditions such as yaw rate $\gamma$, vehicle speed V and steering wheel rotation angle $\theta H$ of the own vehicle 1.

After that, the program goes to S203 in which an own traveling path B ($Xprb[I]$, I=0 to 23) is calculated based on the yaw rate $\gamma$ according to the following processes.

$Xprb[i]=\gamma \cdot Z^2 + 10240$ (millimeters)

$Z=4096 \cdot i + 10240$ (millimeters)

Thus obtained own traveling path B ($Xprb[i]$) is corrected as follows by the state of the steering wheel rotation angle $\theta H$, that is, by respective states, during traveling straightforwardly, during turning a curve and during returning the steering wheel to straight.

$Xprb[i]=Xprb[i] \cdot \alpha$ where $\alpha$ is a correction coefficient.

The correction coefficient $\alpha$ is established to a value ($\neq 0$) from 0 to 1.0. When the vehicle travels straight or when the vehicle transfers from curve to straight, the correction coefficient $\alpha$ is established to a small value so as to reduce the curvature of the traveling path. When the vehicle turns a curve, the correction coefficient $\alpha$ is established to 1.0 so as to employ the curvature derived from the yaw rate $\gamma$ as it is.

Figure 5A:
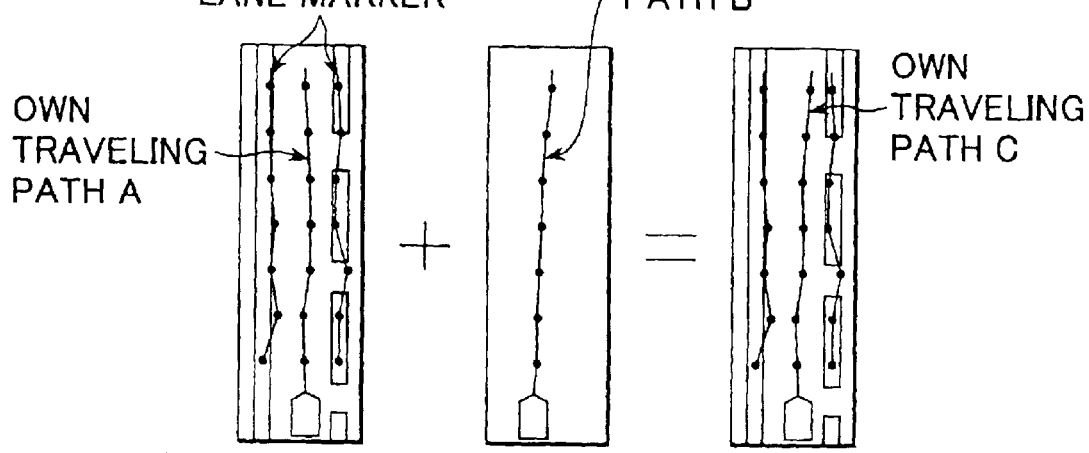
FIG. 5a is an explanatory diagram showing a process of producing a new traveling path C of an own vehicle from the traveling path A and the traveling path B.

Then, the program goes to S204 where an own traveling path C ($Xprc[i]$, i=0 to 23) is calculated based on the own traveling path A ($Xpra[i]$), i=0 to 23) and the own traveling path B ($Xprb[i]$), i=0 to 23) as shown in FIG. 5a.

$Xprc[i]=(Xpra[i] \cdot \lambda + Xprb[i] \cdot \mu)/(\lambda+\mu)$ where $\lambda$ and $\mu$ are values varying according to the result of recognition of circumstances such as road widths.

Figure 5B:
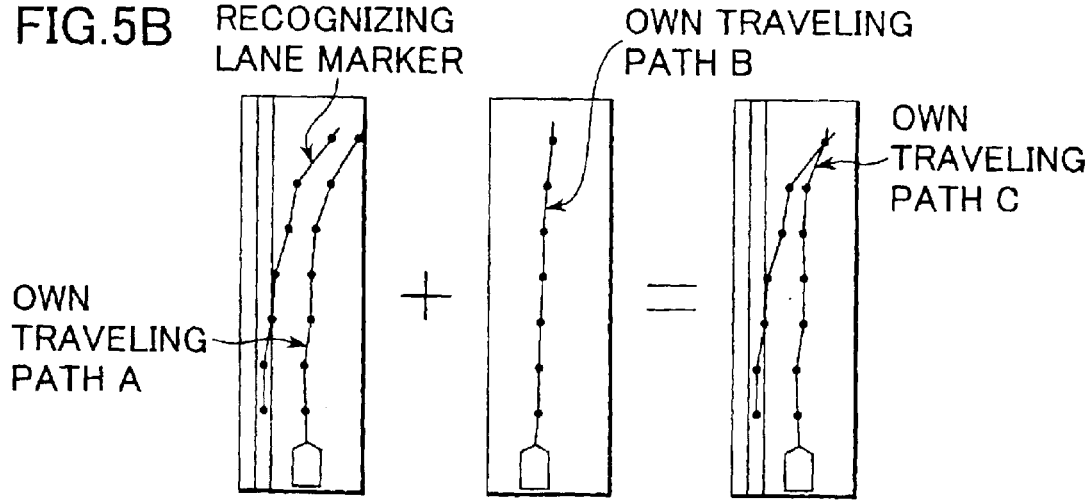
FIG. 5b is an explanatory diagram showing a process of producing the new traveling path C when the traveling path A is erroneously recognized.

Thus, in case where the accuracy of the own traveling path A ($Xpra[i]$, i=0 to 23) is exacerbated by erroneous recognition of lane markers or side walls as shown in FIG. 5b, for example, the recognition accuracy of the own traveling path can be prevented from going down by primarily using the own traveling path B ($Xprb[i]$, i=0 to 23) by means of establishing $\mu$ to a larger value than $\lambda$.

Then, the program goes to S205 in which it is judged whether or not a preceding vehicle is detected and if detected, the program goes to S206 where the segment kpo on Z coordinate of the preceding vehicle is established as follows:

$Kpo=(Z$ coordinate of preceding vehicle$-10.24)/4.096$

Figure 4:
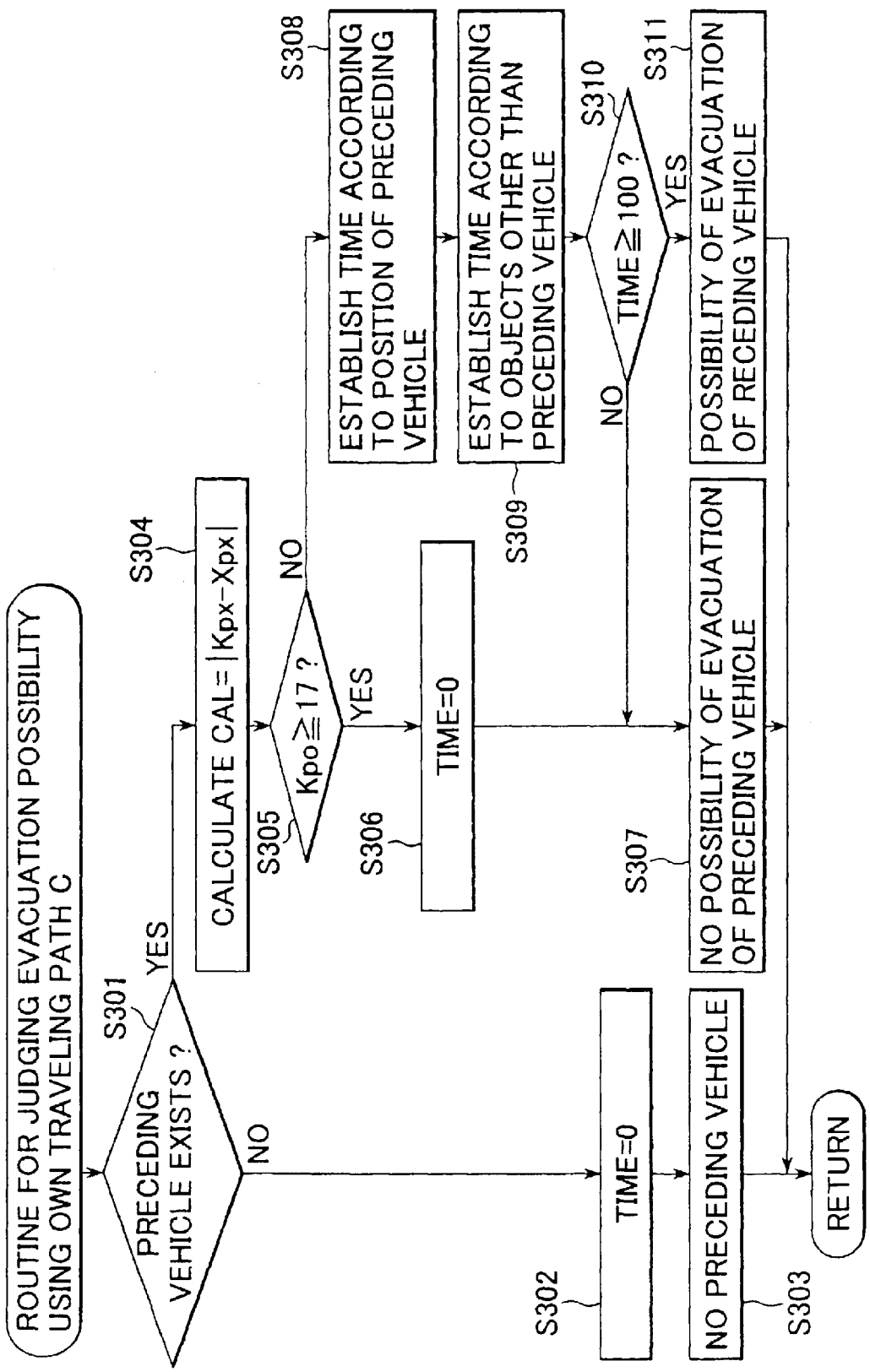
FIG. 4 is a flowchart showing a routine for judging the possibility of a lane change of a preceding vehicle using a traveling path C of an own vehicle.

Then, the program goes to S207 in which the possibility of a lane change of the preceding vehicle is judged using the own traveling path C ($Xprc[i]$, i=0 to 23) calculated at S204, according to a flowchart shown in FIG. 4.

In this routine, first, at S301, it is judged whether or not a preceding vehicle exists. If there is no preceding, the program goes to S302 wherein a judging counter TIME is cleared (TIME=0) and then goes to S303 wherein it is judged that there is no preceding vehicle and such a signal is outputted, leaving the routine. In this embodiment, the signal is the same as a signal indicating that there is a possibility of a lane change of the preceding vehicle. Further, the aforesaid judging counter TIME is for expressing the possibility of a lane change of the preceding vehicle numerically.

On the other hand, in case where it is judged at S301 that there is a preceding vehicle, the program goes to S304 where the absolute value CAL of the difference between X coordinate kpx of the preceding vehicle and X coordinate of the own traveling path C ($Xprc[i]$, i=0 to 23) on Z coordinate of the preceding vehicle, is calculated (CAL=|kpx−xpx|).

The processes from S305 to S311 will be described by reference to FIG. 6.

First, at S305, it is judged whether or not the segment kpo of Z coordinate of the preceding vehicle is larger than 17, that is, the division is more than 80 meters ahead. If kpo is larger than 17, the program goes to S306 in which the judging counter TIME is cleared (TIME=0) and then goes to S307 a signal indicative of no possibility of a lane change of the preceding vehicle is outputted, leaving the routine.

Further, in case where it is judged at S305 that the segment kpo of Z coordinate of the preceding vehicle is smaller than 80 meters, the program goes to S308 in which the judgment counter TIME is initialized according to the position of the preceding vehicle as follows (first lane change possibility judging means):

A. In case where CAL is smaller than 500 millimeters, that is, the preceding vehicle is in the vicinity of the traveling path of the own vehicle (region 1 of FIG. 6),

TIME=0

B. In case where CAL is larger than 500 millimeters, that is, the preceding vehicle is regarded as traveling apart from the traveling path of the own vehicle (1) In case where the segment kpo of Z coordinate of the preceding vehicle is smaller than 80 meters and larger than 50 meters:

In case of 2000≦CAL≦3000 millimeters (region II of FIG., 6)

TIME=TIME+5

In case of other than above (particularly, outside of the region II, note that the preceding vehicle travels around curves)

TIME=TIME−5

Figure 6:
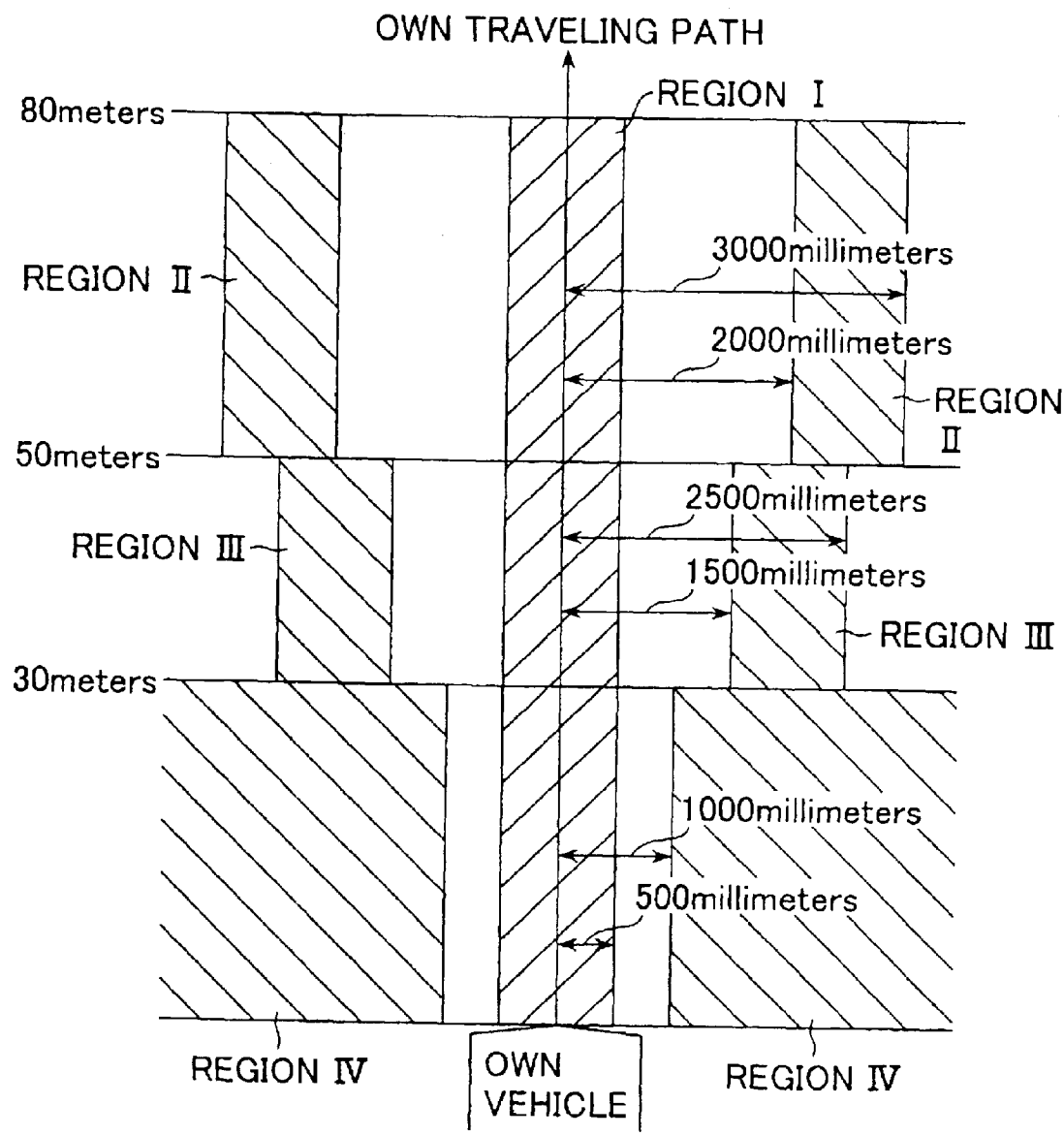
FIG. 6 is an explanatory diagram showing a process for establishing a judging counter.

(2) In case where the segment kpo of Z coordinate of the preceding vehicle is smaller than 50 meters and larger than 30 meters:

In case of 1500≦CAL≦2500 millimeters (region III of FIG. 6)

TIME=TIME+10

In case of other than above (particularly, outside of the region III, note that the preceding vehicle travels around curves)

TIME=TIME−10

(3) In case where the division of kpo of Z coordinate of the preceding vehicle is smaller than 30 meters:

In case of CAL≧1000 millimeters (region IV of FIG. 6)

TIME=TIME+30

In case other than above

TIME=TIME−10

Then, the program goes to S309 wherein the judging counter TIME is established by the solid object other than the preceding vehicle (second lane change possibility judging means). For example, in case where a forward traveling solid object enters a traveling region kpo±1, the judging counter TIME initialized by S308 is additionally initialized as follows:

TIME=TIME+10

Then, the program goes to S310 in which it is judged whether or not TIME is larger than a threshold value (for example 100). If TIME is smaller than 100, the program goes to S307 where after a signal indicative of no possibility of a lane change of the preceding vehicle is outputted, the program leaves the routine. If TIME is larger than 100, the program goes to S311 where a signal indicative of the possibility of a lane change of the preceding vehicle is outputted and leaves the routine. Thus, since the judgment of a lane change of the preceding vehicle is made by the own traveling path C (Xprc[i], i=0 to 23) and the position where the preceding vehicle exists, even when no lane markers are seen, an accurate judgment of a lane change of the preceding vehicle is available. Further, the accurate judgment of a lane change of the preceding vehicle can prevent the ACC system from following up the preceding vehicle hazardously.

Since the introduction of this lane change judgment process enables an accurate judgment of the possibility of a lane change of the preceding vehicle as a monitoring object based on information of the position of the preceding vehicle, the traveling path of the own vehicle and the objects in the neighborhood of the preceding vehicle, not only the preceding vehicle can be continued to be caught as a monitoring object, but also every behavior of the preceding vehicle including the change of the preceding vehicle from one to another can be detected with quick responsibility and accuracy. As a result, the traveling control can be executed stably in a manner similar to driver's driving senses.

Thus, after the judging processes of the possibility of a lane change of the preceding vehicle are executed using the own traveling path C (Xprc[i], i=0 to 23) at S207, the program goes to S208 where it is judged from the result of the judgment at S207 whether or not there is a possibility of a lane change of the preceding vehicle.

If it is judged that there is no possibility of a lane change of the preceding vehicle, the program goes to S209 wherein it is judged whether or not the turn signal switch 9 of the own vehicle is turned on. If the turn signal switch 9 is turned off, the program goes to S210 in which it is judged whether or not the absolute value of the steering wheel rotation angle is larger than a specified value, for example 90 degrees. If it is smaller than the specified value, the program goes to S211 where a new own traveling path E (Xpre[i], i=0 to 23) is based on the own traveling path C (Xprc[i], i=0 to 23) and the own traveling path D (Xpre[i], i=0 to 23) according to the following formula:

$$Xpre[i]=Xprc[i]$$

where i=0 to (kpo−2), (kpo+1) to 23

$$Xpre[i]=(Xprc[I]+xpo \cdot \kappa)/(1.0+\kappa)$$

where i=kpo−1, kpo

Figure 5C:
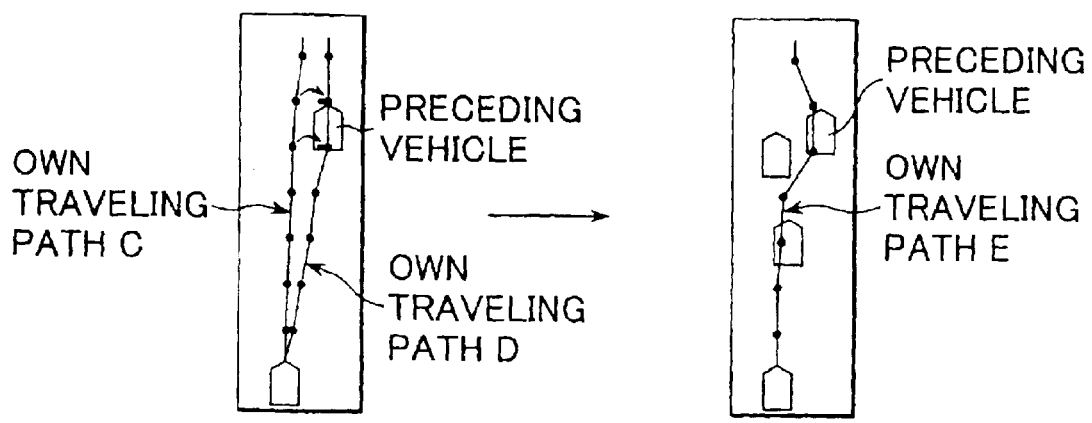
FIG. 5c is an explanatory diagram showing a process of calculating a new traveling path E from the traveling path C and the traveling path D (traveling path of a preceding vehicle)

In this embodiment, the own traveling path D is expressed only by X coordinate xpo at the division kpo of Z coordinate of the preceding vehicle. Further, κ is a variable varying according to the recognition of circumstances. When the recognition of circumstances is inferior, κ is established to a large value. That is, in the process of S211, as shown in FIG. 5c, taking the case where the preceding vehicle changes the lane into consideration, only the neighborhood of the preceding vehicle is corrected with respect to the preceding vehicle so that the ACC system 2 operates with accuracy.

Then, the program goes to S212 wherein the present own path (Xprc[i], i=0 to 23) is calculated from the own traveling path E (Xpre[i], i=0 to 23) newly calculated presently and the own traveling path (Xpr(n−1)[i], i=0 to 23) calculated in the previous cycle and stored at S201 as follows:

$$Xpr(n)[i]=Xpr(n-i)[i] \cdot \phi - Xpre[i] \cdot (1.0-\phi)$$

where φ is a value established according to traveling conditions of the own vehicle. For example, when the vehicle transfers from curved road to straight road, φ is established to a small value so as to impose more weight on the own traveling path E (Xpre[i], i=0 to 23) calculated newly, presently and otherwise φ is established to a large value so as to impose more weight on the own traveling path (Xpr(n−1)[i], i=0 to 23) calculated in the previous cycle. As a result, the response in accordance with the traveling conditions can be obtained.

On the other hand, in case where it is judged at S205 that there is no preceding vehicle, or in case where it is judged at S208 that there is a possibility of a lane change, the program goes to S213. Similarly, in case where it is judged at S209 that the turn signal switch 9 is turned on, or in case where it is judged at S210 that the absolute value of the steering wheel rotation angle is larger than a specified value, the program goes to S213.

At S213, the present own traveling path (Xpr(n)[i], i=0 to 23) is calculated from the own traveling path C (Xprc[i], i=0 to 23) calculated at S204 and the previous own traveling path (Xpr(n−1)[i], i=0 to 23) stored at S201 in the following manner:

$$Xpr(n)[i]=Xpr(n-1)[i]\cdot\phi-Xprc[i]\cdot(1.0-\phi)$$

After the own traveling path is estimated, the program goes to S103 where the preceding vehicle is extracted, leaving the routine. The extraction of the preceding vehicle is performed as follows:

First, the traveling region A is established based on the traveling path of the own vehicle according to the solid object. Further, the traveling region B is established based on at least either of the traveling region A and road information (road profile estimated from lane markers and side walls). Then, if the detected solid object exists in the traveling region A and if the duration for which the solid object stays in either of the traveling regions A and B, is larger than a specified time and if the solid object is a forward moving object and if the object is nearest one to the own traveling vehicle 1, the solid object is regarded and extracted as a preceding vehicle.

According to the embodiment of the present invention, since the final own traveling path is calculated based upon the own traveling path A (Xpra[i], i=0 to 23) obtained from lane marker and side wall data and the own traveling path B (Xprb[i], i=0 to 23) derived from the yaw rate of the own vehicle 1 and the own traveling path D (Xprd[i], i=0 to 23) calculated based on the trace of the preceding vehicle, the own traveling path can be estimated accurately, stably and securely.

Further, when the own traveling path C (Xprc[i], i=0 to 23) is calculated from the own traveling path A (Xpra[i], i=0 to 23) and the own traveling path B (Xprb[i], i=0 to 23) and the own traveling path E (Xpre[i], i=0 to 23) is newly calculated using the own traveling path C (Xprc[i], i=0 to 23) and the own traveling path D (Xprd[i], i=0 to 23) produced based on the traveling trace of the preceding vehicle, since an accurate judgment process of a lane change is executed using the own traveling path C (Xprc[i], i=0 to 23) and the own traveling path E (Xpre[i], i=0 to 23) is synthesized according to the result of the judgment, unnecessary calculations according to every behavior of the preceding vehicle can be effectively prevented from being made and as a result an accurate calculation of the own traveling path can be performed.

Further, the ON-OFF signal of the turn signal switch 9 and the value of the steering wheel rotation angle enable to obtain the final own traveling path in a natural manner reflecting driver's intention.

Furthermore, when the own traveling path E (Xpre[i], i=0 to 23) is calculated using the own traveling path C (Xprc[i], i=0 to 23) and the own traveling path D (Xprd[i], i=0 to 23) derived from the traveling trace of the preceding vehicle, since the possibility of a lane change is judged not only according to the behavior of the preceding vehicle but also according to that of the solid object other than the preceding vehicle in the neighborhood of the preceding vehicle, the judgment of a lane change can be made more correctly.

The entire contents of Japanese Patent Application No. Tokugan 2002-271905 filed Sep. 18, 2002, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A vehicle surroundings monitoring apparatus, comprising:
   frontal information detecting means for detecting at least solid object information and traveling road information in front of an own vehicle;
   preceding vehicle trace calculating means for calculating a trace of a preceding vehicle from past data of said preceding vehicle;
   first own traveling path calculating means for calculating a first traveling path of said own vehicle based on said traveling road information;
   second own traveling path calculating means for calculating a second traveling path of said own vehicle based on said trace of said preceding vehicle; and
   final own traveling path calculating means for calculating a final traveling path of said own vehicle based on said first traveling path and said second traveling path.

2. The vehicle surroundings monitoring apparatus according to claim 1, wherein said final own traveling path is calculated from a previous own traveling path and a present own traveling path.

3. The vehicle surroundings monitoring apparatus according to claim 1, wherein said final own traveling path is calculated based on respectively weighted own traveling paths.

4. The vehicle surroundings monitoring apparatus according to claim 1, wherein when other own traveling paths are calculated using said second own traveling path, said second own traveling path is effectively used only in the vicinity of said preceding vehicle.

5. A traveling control system for controlling a traveling of an own vehicle at least based on said final own traveling path calculated by said vehicle surroundings monitoring apparatus recited in claim 1.

6. A vehicle surroundings monitoring apparatus, comprising:
   frontal information detecting means for detecting at least solid object information and traveling road information in front of an own vehicle;
   preceding vehicle trace calculating means for calculating a trace of a preceding vehicle from past data of said preceding vehicle;
   first own traveling path calculating means for calculating a first traveling path of said own vehicle based on said traveling road information;
   second own traveling path calculating means for calculating a second traveling path of said own vehicle based on said trace of said preceding vehicle;

third own traveling path calculating means for calculating a third traveling path of said own vehicle based on traveling conditions of said own vehicle; and final own traveling path calculating means for calculating a final traveling path of said own vehicle based on said first traveling path, said second traveling path and said third traveling path.

7. The vehicle surroundings monitoring apparatus according to claim 6, wherein said traveling conditions include at least a yaw rate of said own vehicle.

8. The vehicle surroundings monitoring apparatus according to claim 6, wherein said final own traveling path is calculated from a previous own traveling path and a present own traveling path.

9. The vehicle surroundings monitoring apparatus according to claim 6, wherein said final own traveling path is calculated based on respectively weighted own traveling paths.

10. A traveling control system for controlling a traveling of an own vehicle at least based on said final own traveling path calculated by said vehicle surroundings monitoring apparatus recited in claim 6.

11. A vehicle surroundings monitoring apparatus, comprising:

frontal information detecting means for detecting at least solid object information and traveling road information in front of an own vehicle;

preceding vehicle trace calculating means for calculating a trace of a preceding vehicle from past data of said preceding vehicle;

first own traveling path calculating means for calculating a first traveling path of said own vehicle based on said traveling road information;

second own traveling path calculating means for calculating a second traveling path of said own vehicle based on said trace of said preceding vehicle;

third own traveling path calculating means for calculating a third traveling path of said own vehicle based on traveling conditions of said own vehicle;

fourth own traveling path calculating means for calculating a fourth traveling path of said own vehicle based on said first own traveling path and said third own traveling path; and final own traveling path calculating means for calculating a final traveling path of said own vehicle based on said fourth traveling path and said second traveling path when a preestablished condition is satisfied.

12. The vehicle surroundings monitoring apparatus according to claim 11, wherein said preestablished condition is that the preceding vehicle exists and there is no possibility of a lane change of said preceding vehicle and said own vehicle does not make a turn.

13. The vehicle surroundings monitoring apparatus according to claim 11, wherein said traveling conditions include at least a yaw rate of said own vehicle.

14. The vehicle surroundings monitoring apparatus according to claim 11, wherein said final own traveling path is calculated from a previous own traveling path and a present own traveling path.

15. The vehicle surroundings monitoring apparatus according to claim 11, wherein said final own traveling path is calculated based on respectively weighted own traveling paths.

16. A traveling control system for controlling a traveling of an own vehicle at least based on said final own traveling path calculated by said vehicle surroundings monitoring apparatus recited in claim 11.

* * * * *